(12) United States Patent
Kushida et al.

(10) Patent No.: US 8,997,060 B2
(45) Date of Patent: Mar. 31, 2015

(54) PARALLEL PROGRAM ANALYSIS AND BRANCH PREDICTION

(71) Applicant: International Business Machines Corporation, Armonk, NY (US)

(72) Inventors: Takayuki Kushida, Tokyo (JP); Takuya Mishina, Kanagawa (JP); Hitomi Takahashi, Tokyo (JP); Takaaki Tateishi, Kanagawa-Ken (JP)

(73) Assignee: International Business Machines Corporation, Armonk, NY (US)

(*) Notice: Subject to any disclaimer, the term of this patent is extended or adjusted under 35 U.S.C. 154(b) by 51 days.

(21) Appl. No.: 13/955,669

(22) Filed: Jul. 31, 2013

(65) Prior Publication Data
US 2015/0040108 A1 Feb. 5, 2015

(51) Int. Cl.
*G06F 9/44* (2006.01)
*G06F 11/36* (2006.01)

(52) U.S. Cl.
CPC .......... *G06F 11/3612* (2013.01); *G06F 11/362* (2013.01)
USPC .......................................... 717/129; 717/132

(58) Field of Classification Search
CPC ................................................... G06F 11/362
USPC ................................................... 717/129, 132
See application file for complete search history.

(56) References Cited

U.S. PATENT DOCUMENTS 6,070,009 A * 5/2000 Dean et al. ..................... 717/130
7,496,735 B2 * 2/2009 Yourst et al. .................. 712/218

FOREIGN PATENT DOCUMENTS

| JP | 06175882 | 6/1994 |
|----|----------|--------|
| JP | 08328897 | 12/1996 |
| JP | 11073326 | 3/1999 |
| JP | 2000010815 | 1/2000 |

OTHER PUBLICATIONS

Henk Erik van der Hoek, "Finding Sufficient Conditions to Guarantee Freedom from Deadlock when using Futures in X10 Programs", 2008.*
Chipounov et al., "S2E: A platform for In-Vivo Multi-Path Analysis of Software Systems", 2011.*
Kamil et al, "Concurrency Analysis for Parallel Programs with Textually Aligned Barriers", 2006.*

* cited by examiner

*Primary Examiner* — Phillip H Nguyen
(74) *Attorney, Agent, or Firm* — Tutunjian & Bitetto, P.C.; Vazken Alexanian (57) ABSTRACT

Systems and methods for predicting execution paths of at least one target program of a plurality of programs that are run in parallel are described. In one method, execution flows of programs are generated by conducting a static analysis. In addition, the programs are executed to obtain debug logs from the programs. Further, communication messages transmitted between the execution flows are identified from the debug logs. A deduction that at least one conditional branch was taken in at least one given execution flow of the first execution flows by the target program is made based on the communication messages that are identified in the debug logs. Based on the deduction, at least one conditional branch that was not taken is removed from the given execution flow. In addition, modified execution flows that were modified in accordance with the removal are output to indicate predicted execution paths of the target program.

20 Claims, 7 Drawing Sheets

Task A: 502
void main() {
/*.....*/
DBG_MSG("A1");
enqueue(&message, q1);
*......*/
}

Task B: 506
void main() {
/*.....*/
DBG("B1");
If(FLAG&0x01){
    dequeue(&message, q1);
}else{
    FLAG |=0x01;
}
DBG("B2");
/*......*/
}

504
Debug Message:
03:00:54 TaskA:A1

508
Debug Message:
02:58:00 TaskB:B1
03:00:57 TaskB:B2

PARALLEL PROGRAM ANALYSIS AND BRANCH PREDICTION

BACKGROUND

1. Technical Field

The present invention relates to parallel program analysis, and, more particularly, to predicting execution flows of parallel programs.

2. Description of the Related Art

Predicting the behavior of the programs executed on a computer is relatively complicated due to a multitude of possible execution flows resulting from various conditional branches that can be taken and combinations of branches that can be taken by the programs. The problem is even more complex when considering the realistic and practical scenario in which several programs and processes are executed simultaneously and in which the various programs and processes can affect the execution of other programs and processes. There are many different types of programs which process in parallel among a plurality of hosts and processes. These programs communicate with each other while executing various processes and their behavior changes frequently as messages are exchanged between programs and processes. Debug messages generated by the program can be used to identify the behavior of the programs.

SUMMARY

One embodiment of the present invention is directed to a method for predicting execution paths of at least one target program of a plurality of programs that are run in parallel. In accordance with the method, first execution flows of the plurality of programs are generated by conducting a static analysis of the plurality of programs. In addition, the programs are executed to obtain debug logs from the programs. Further, communication messages transmitted between the execution flows are identified from the debug logs. A deduction that at least one conditional branch was taken in at least one given execution flow of the first execution flows by the target program is made based on the communication messages that are identified in the debug logs. Based on the deduction, at least one conditional branch that was not taken is removed from the given execution flow. In addition, modified execution flows that were modified in accordance with the removal are output to indicate predicted execution paths of the target program.

Another embodiment of the present invention is directed to a non-transitory computer readable medium comprising a computer readable program for predicting execution paths of at least one target program of a plurality of programs that are run in parallel, wherein the computer readable program when executed on a computer causes the computer to perform the following steps: generating first execution flows of the plurality of programs by conducting a static analysis of the programs; executing the programs to obtain debug logs from the programs; identifying communication messages transmitted between the execution flows from the debug logs; deducing that at least one conditional branch was taken in at least one given execution flow of the first execution flows by the target program based on the communication messages that are identified in the debug logs and removing, based on the deduction, at least one conditional branch that was not taken from the given execution flow; and outputting modified execution flows that were modified in accordance with the removal to indicate predicted execution paths of the at least one target program.

Another embodiment of the present invention is directed to a system for predicting execution paths of at least one target program of a plurality of programs that are run in parallel. The system includes a static analysis module, a parallel program analysis module, and a third module. The static analysis module is configured to generate first execution flows of the programs by conducting a static analysis of the programs. In addition, the parallel program analysis module is configured to execute the programs to obtain debug logs from the programs, identify communication messages transmitted between the execution flows from the debug logs, deduce that at least one conditional branch was taken in at least one given execution flow of the first execution flows by the target program based on the communication messages that are identified in the debug logs, and remove at least one conditional branch that was not taken from the given execution flow. Further, the third module is configured to output modified execution flows that were modified in accordance with the removal of the conditional branch that was not taken to indicate predicted execution paths of the at least one target program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention described herein are directed to determining the most likely executed branches of programs that are run in parallel. In particular, preferred embodiments are directed to interrelated programs that send and receive messages between themselves and, as a result, affect the various processes run by the programs. The determination of the executed branches and, more importantly, the determination of branches that are likely not executed can provide insights that enable the improvement of the efficiency of executing the programs. For example, as noted below, in preferred embodiments of the present invention, unnecessary modules or tasks of an operating system, such as application programming interfaces, associated with unlikely branches can be removed from the operating system to conserve resources and expedite processing calls associated with the parallel execution of the programs. In addition, the embodiments can achieve this without in any way modifying the software of the parallel programs or adding new debugging software to the programs.

In general, it is difficult to predict and identify the paths taken in an execution flow of a program using only the debug messages provided by the program when the program interacts with other programs run in parallel. Further, it is also difficult for developers to add new debug message software to any of the programs without affecting their functionality and operability. Moreover, the debugging features of the programs have limits on the number of debug messages they produce because such software needs to execute effectively in real time and concurrently with the debugging features.

As discussed in detail herein below, in accordance with various aspects of the present invention, the most likely executed branches of the program are determined by static analysis of the program code and by employing debug logs of the executed program without modification of the program or the execution environment. Here, the static analysis finds all workflows of the program, including points at which the portions of the debug log are output, as well as send-receive application programming interface pairs. Further, the executed workflows of other programs run in parallel with the target program can also be found by static analysis, and the paths taken by the execution flows of the other programs can be determined based on the effects of the execution flows of the target program on these programs. Moreover, by determining and predicting the execution flows of the parallel programs, processing efficiency can be improved by removing modules and scheduled tasks of the operating system associated with branches that are not likely to be taken, as mentioned above and as described in detail herein below.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium, which is different from a computer readable signal medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
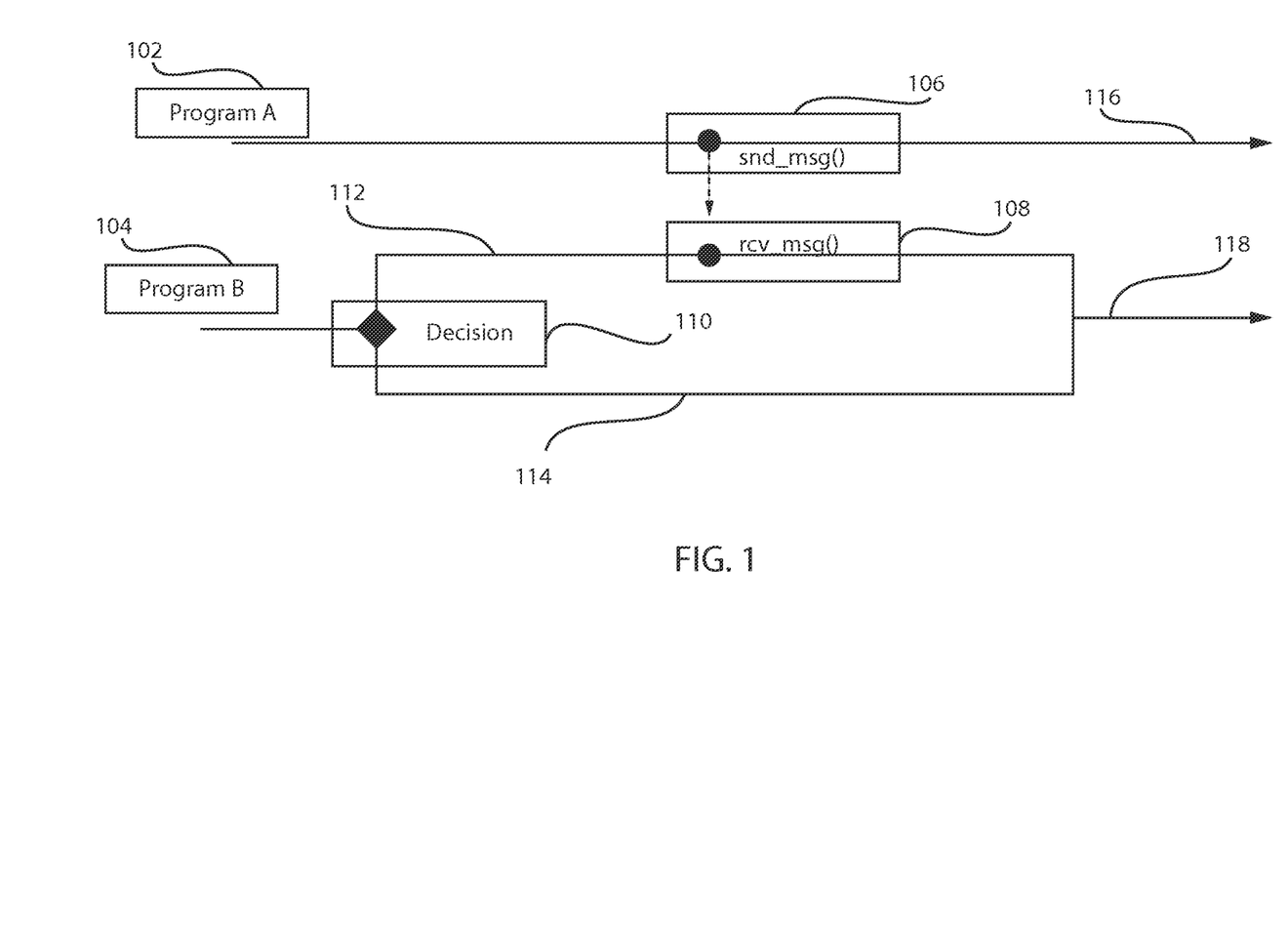
FIG. 1 is a high-level block/flow diagram illustrating a simplified representation of parallel programs.

Referring now to the drawings in which like numerals represent the same or similar elements and initially to FIG. 1, a block/flow diagram illustrating a simplified representation of programs 102 and 104 and processing characteristics of interest is depicted. Here, the program A 102 sends a message 106 to the program B 104 along timeline 116. In turn, program B 104 includes a decision step 110 at which the program 104 determines which of two conditional branches 112 and 114 it will take. In this example, the conditional branch 112 receives a message at block 108 along time line 118. Exemplary embodiments of the present invention described herein can determine the execution flows of the programs by static analysis and can deduce which conditional branches are likely to be taken and not taken based on debug logs obtained by executing the programs. For example, the system can deduce that the branch 112 is taken by matching the conditional branch 112 of the program B 104 with the send message 106 of the program A 102 by using log times of the debug logs of the executed programs. Further, based on this information, the operating system can be modified by removing any unnecessary modules and tasks associated with the branch that is not likely to be taken, branch 114, thereby improving the processing efficiency of the operating system when running the programs in parallel.

Figure 2:
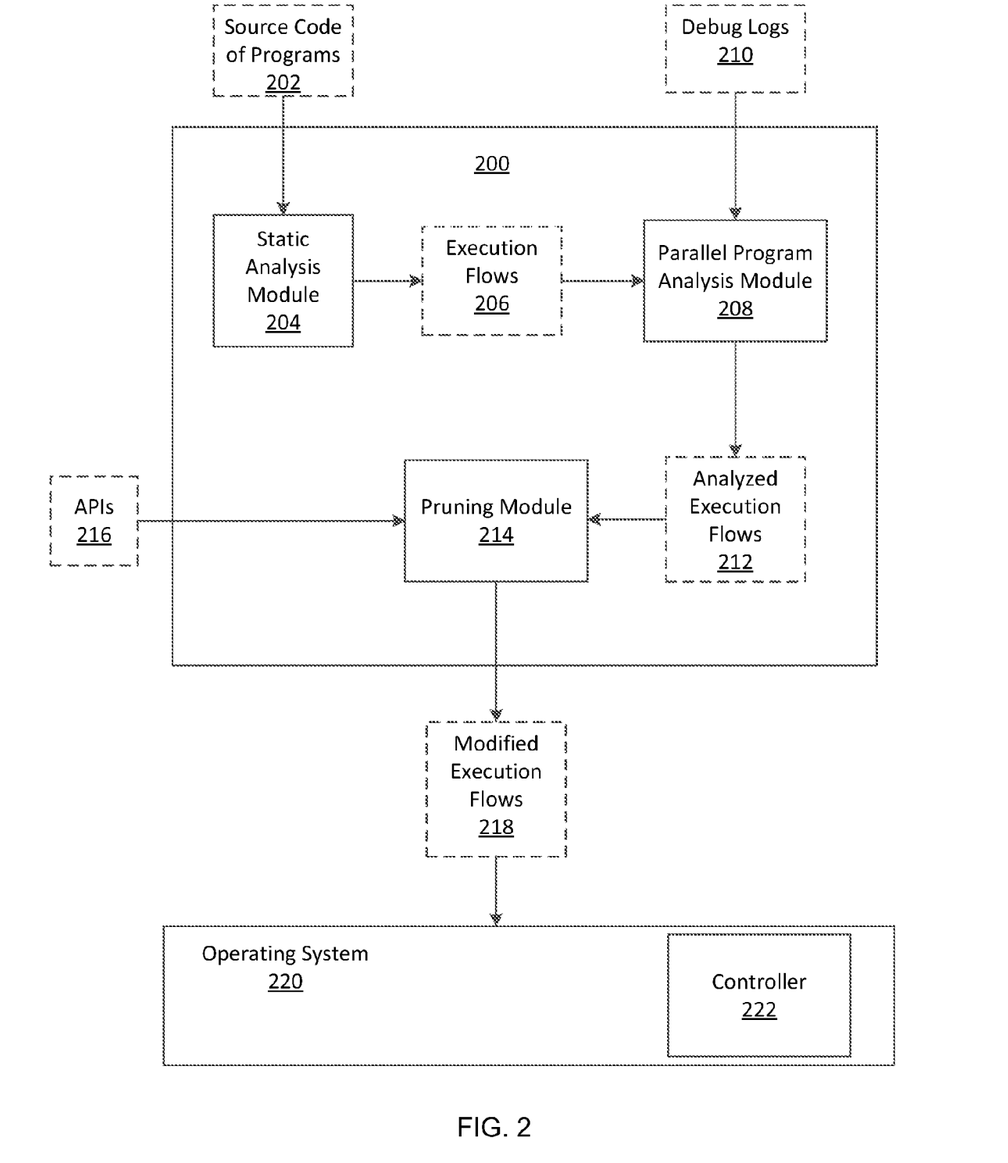
FIG. 2 is a high-level block/flow diagram of a system for predicting execution paths of at least one target program of a plurality of programs that are run in parallel in accordance with an exemplary embodiment of the present invention.

With reference now to FIG. 2, an exemplary system 200 for predicting execution paths of at least one target program of a plurality of programs that are run in parallel is illustratively depicted. The system 200 can include a static analysis module 204, a parallel program analysis module 208 and a pruning module 214. The static analysis module 204 can receive source code information 202 of the programs to be run in parallel and can output an initial set of execution flows 206 to the parallel program analysis module 208. In turn, the parallel program analysis module 208 can analyze the execution flows with debug logs 210 obtained by executing the programs in parallel. Further, the parallel program analysis module 208 can deduce most likely and least likely branches of the execution flows and can remove the least likely branches from the execution flows to produce the set of execution flows 212. In addition, the pruning module 214 can prune the set of execution flows using, for example, send-receive API pairs 216, as discussed further herein below. The pruning module 214 can then modify the execution flows to remove additional unlikely branches and thereby generate modified execution flows 218. The system 200 can also include a controller 222 of an operating system 220 that is configured to modify the operating system to remove unnecessary tasks and modules.

Figure 3:
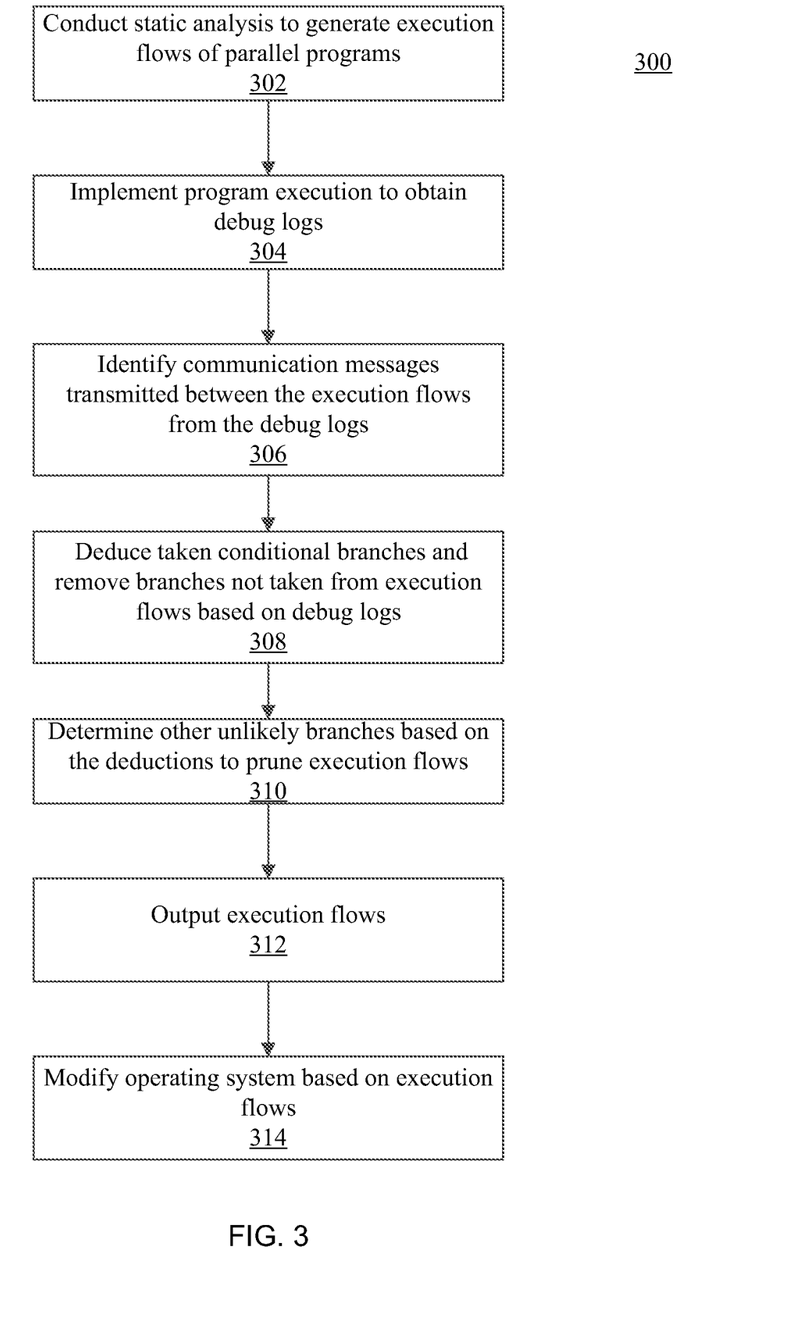
FIG. 3 is a high-level flow diagram of a method for predicting execution paths of at least one target program of a plurality of programs that are run in parallel in accordance with an exemplary embodiment of the present invention.
Figure 4:
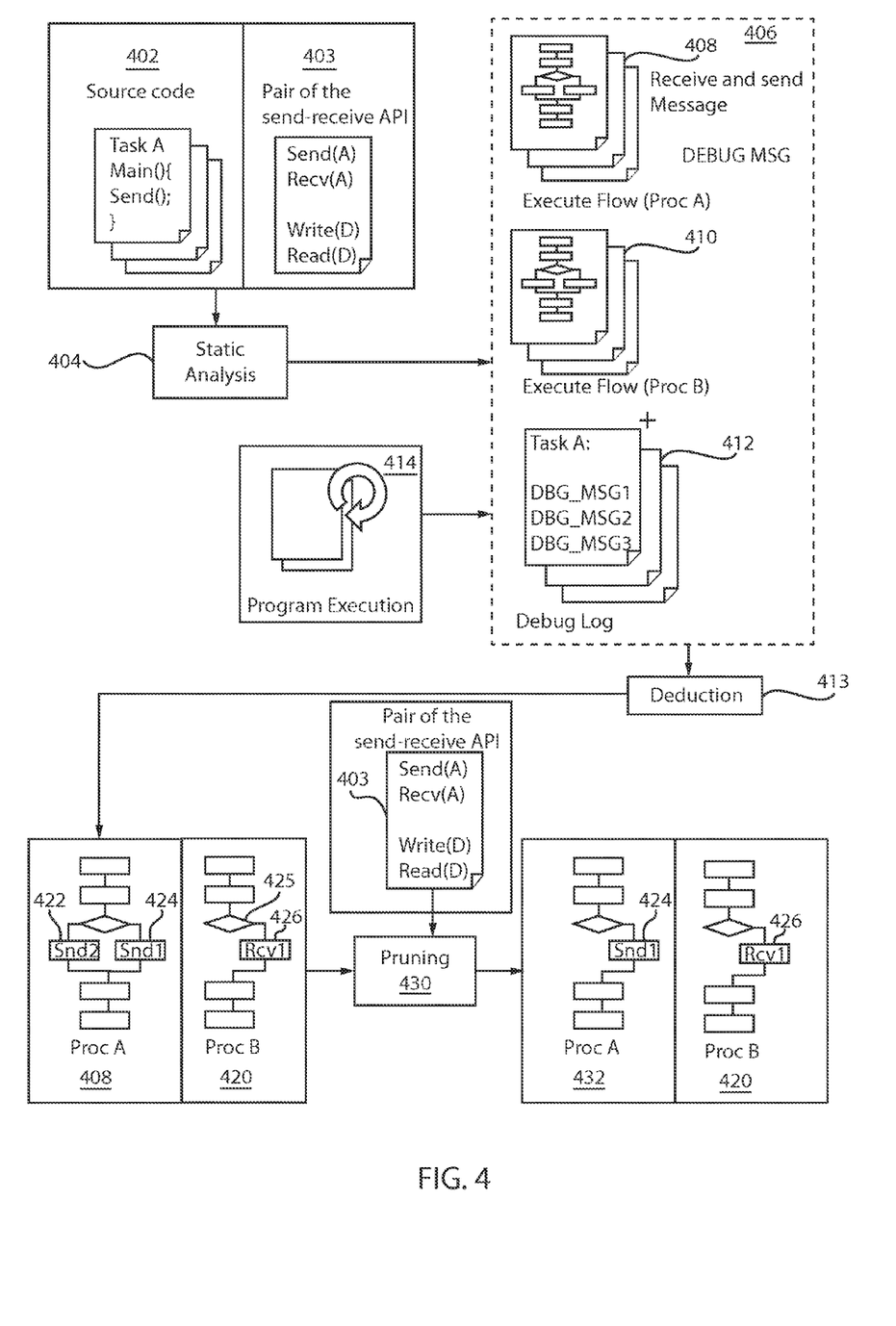
FIG. 4 is a high-level flow diagram of a more detailed process for predicting execution paths of at least one target program of a plurality of programs that are run in parallel in accordance with an exemplary embodiment of the present invention.

To illustrate the various functionalities of the system 200, reference is made to FIG. 3, depicting a block/flow diagram of a method 300 for predicting execution paths of at least one target program of a plurality of programs that are run in parallel, which can be performed by the system 200. Reference is also made to FIG. 4, which provides a detailed block/flow diagram of the process implemented by the method 300 with respect to a specific example.

The method 300 can begin at step 302 at which the static analysis module 204 conducts a static analysis of the source code of programs that are to be run in parallel and thereby generate an initial set of execution flows for the programs. For example, as illustrated in FIG. 4, the static analysis module 204 can receive the source code 402 of the parallel programs and can receive pairs of send-receive API pairs 403 for messages transmitted between processes of the parallel programs. These API pairs are generated by the existing lexical analysis of the source code or are inputted manually by the users. Based on the source code 402 and the APIs 403, the static analysis module 204 can generate the execution flow 408 of a first process A and the execution flow 410 of a second process B. Here, the process A and process B can be processes executed by different programs of the parallel programs or can be different processes that are executed by a single program of the parallel programs. Nodes in each of the execution flows can denote the point at which debug log messages or values are output and can denote sending of messages to and/or receiving messages from other programs or processes run in parallel with the execution flow. A node can contain additional information about the messaging procedure, such as send or receive operations, from the static analysis, which can be based on an analysis of dataflow or strings.

At step 304, the parallel program analysis module 208 can execute the parallel programs to obtain debug logs from the programs. For example, as illustrated at block 414, the programs can be executed in parallel and debug logs 412 can be obtained from the programs after they are executed.

At step 306, the parallel program analysis module 208 can identify communication messages transmitted between the execution flows from the debug logs. For example, the parallel program analysis module 208 can determine that elements 422 and 424 are send messages "snd2" and "snd1," as indicated in the execution flow 408, and can identify receive messages "rcv2" (not shown in block 420) and "rcv1" 426 as receive messages that can be received after the decision step 425, as indicated in the execution flow 410.

At step 308, the parallel program analysis module 208 can deduce that at least conditional branch was taken by the target program in at least one given execution flow of the execution flows based on the communication messages that are identified in the debug logs. Further, the parallel program analysis module 208 can remove at least one conditional branch that was not taken from the given execution flow based on the deduction. For example, as illustrated in FIG. 4, at block 413, the parallel program analysis module 208 can conduct an analysis of the debug logs 412 and the execution flows 408 and 410 to determine that the rcv1 message branch 426 in the execution flow of the process A was taken. Further, based in this determination, the parallel program analysis module 208 can deduce that the rcv2 message branch (not shown in block 420) after element 425 in the execution flow of the process A was not taken and can remove the branch from the execution flow 410. Thus, the parallel program analysis module 208 can output execution flow 408 and execution flow 420, from which the rcv2 message branch was removed.

Figure 5:
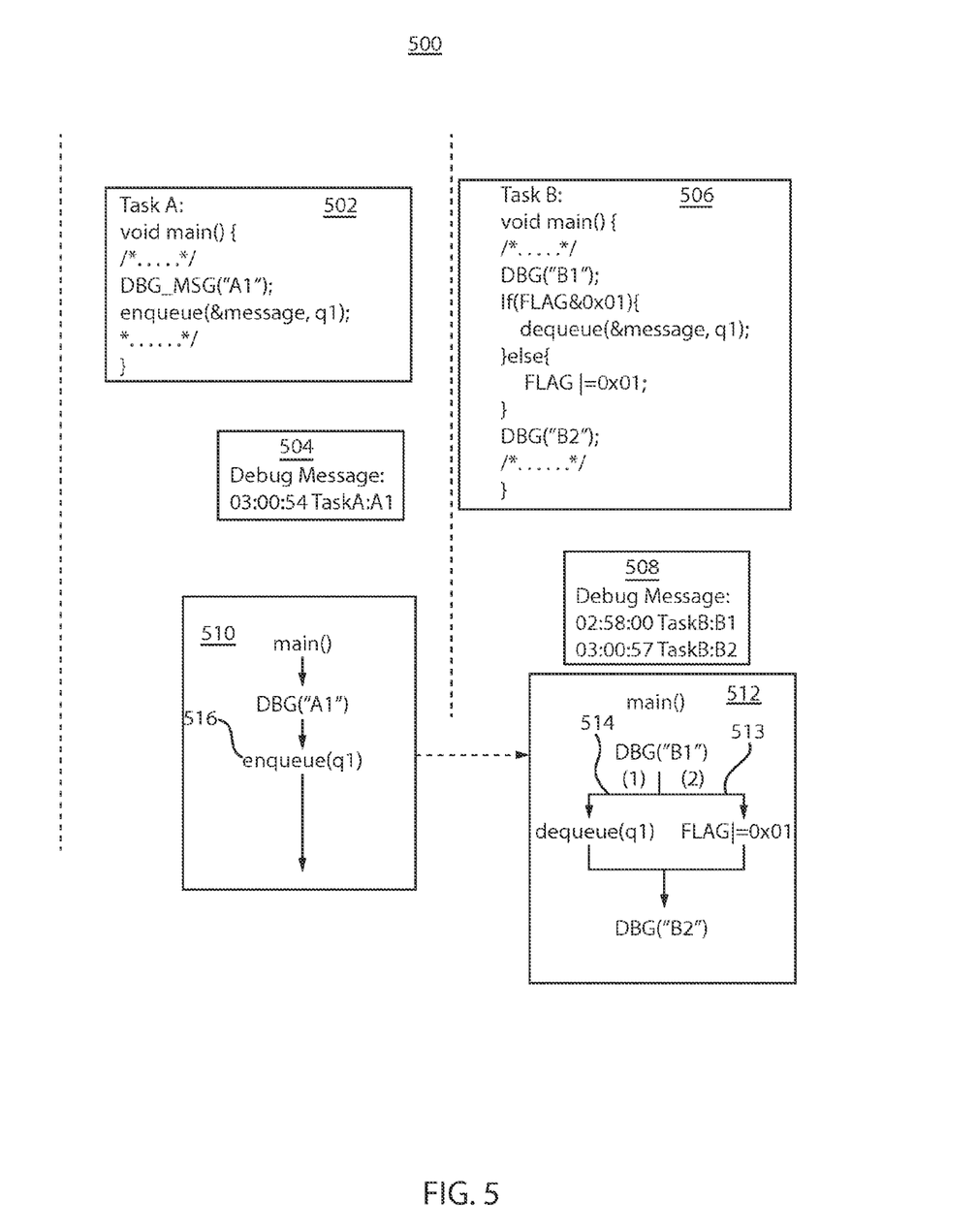
FIG. 5 is a high-level block/flow diagram illustrating an example of how conditional branches can be determined to be taken in accordance with an exemplary embodiment of the present invention.

FIG. 5 illustrates an example 500 of how the deduction of step 308 can be performed by the parallel program analysis module 208. As shown in FIG. 5, a task A of a first process, such as process A described above with respect to FIG. 4, is defined in a source code fragment 502 for the program that implements the process. Here, the fragment 502, which can be taken from source codes 402, indicates that a debug message A1 is output, followed by a transmission of a message and a queueing operation for element q1. Further, for the task A of the first process, a debug message 504 from the debug log 412 for the first process indicates that the debug message was output at 3:00:54. FIG. 5 also illustrates a task B of a second process, such as process B described above with respect to FIG. 4, that is defined in a source code fragment 506 for the program that implements the process. The fragment 506, which also can be taken from source codes 402, indicates that a debug message B1 is output, followed by a decision step with two conditional branches. The task B takes the conditional branch (1) if a flag is set and it receives a dequeue message, where, in conditional branch (1), the task implements a dequeue of q1. Otherwise, the task B takes the conditional branch (2), at which it implements a flag operation. After either of the conditional branches, the code fragment 506 indicates that another debug message B2 is output. Further, for the task B of the second process, a debug message 508 from the debug log 412 for the second process indicates that the debug message B1 was output at 2:58:00 and that the debug message B2 was output at 3:00:57.

Based on the code fragments, as described above with respect to FIG. 4, the static analysis module 204 can generate an execution flow 510 for the process A/task A and an execution flow 512 for the process B/task B. Based on the source code 502 and 506 and/or the execution flows 510 and 512, as well as the debug messages 504 and 508, the parallel program analysis module 208 can deduce that the conditional branch (1) 514 of the Task B was taken. For example, the parallel program analysis module 208 can compare a debug log time of a send or a receive task of at least one execution flow to a debug log time of a task that includes given conditional branches to determine which of the given conditional branches was taken and to remove any of the given conditional branches that was not taken. For example, here, the parallel program analysis module 208 can compare the debug log time of message A1 in message 504, which corresponds to the transmission of the queueing message sent by the task A, to the debug log times of debug messages B1 and B2, which correspond to the conditional branches (1) and (2) of the task B. In particular, based on the code fragment 506, it is clear that one of the conditional branches (1) and (2) was taken between debug message B1 time 02:58:00 and debug message B2 time 03:00:57. Thus, the parallel program analysis module 208 can make the comparison to determine whether the debug log time of the send message of task A falls within the interval defined by debug message B1 time 02:58:00 and debug message B2 time 03:00:57, which denotes the taking of one of the conditional branches (1) or (2). If the debug log time of the send message falls within the interval, then the parallel program analysis module 208 determines that the conditional branch (1) was taken, as the sending of the message from task A would indicate that the task B received the message at the appropriate time frame. Otherwise, the parallel program analysis module 208 determines that the conditional branch (2) was taken. In this case, because the debug log time of the send message of task A is 03:00:54, which falls within the interval defined by debug message times B1 and B2, the parallel program analysis module 208 deduces that the conditional branch (1) was taken and that the conditional branch (2) 513 was not taken in the execution flow 512. As such, the parallel program analysis module 208 can delete the conditional branch (2) 513 from the execution flow 512. It should be noted that in other implementations, the parallel program analysis module 208 can apply one or more user-defined time buffer values to each of the debug message times B1 and B2 of the interval to account for processing time for the transmission of messages between the tasks. Thus, for example, assume that the task B receives the message sent from task A. However, the debug message log time B1 may denote a time that is after the log time for debug message A1 due to the processing time of the operating system. Thus, a buffer time value accounting for the transmission time of the message sent by Task A can be subtracted from the debug message log time B1 so that the debug log time of the send message of task A falls within the interval and enables the parallel program analysis module 208 to determine that the conditional branch (1) 514 was taken.

Figure 6:
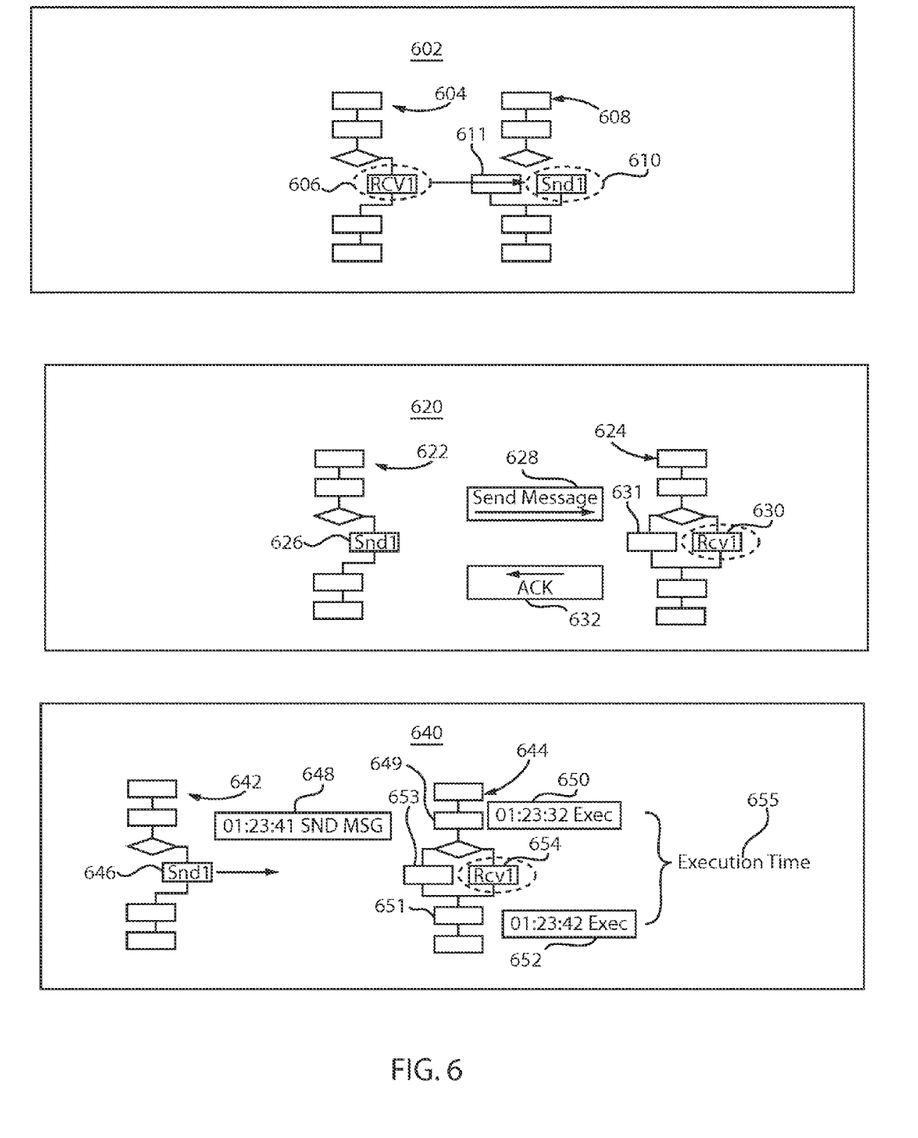
FIG. 6 depicts diagrams illustrating other examples of how conditional branches can be determined to be taken in accordance with an exemplary embodiment of the present invention.

FIG. 6 depicts other scenarios illustrating examples of how the deduction of step 308 can be performed by the parallel program analysis module 208. For example, with respect to these scenarios, it can be assumed that the pair of send (SND) and receive (RCV) functions are defined by users initially, wherein the RCV function receives a message sent by the SND function. The parallel program analysis module 208 can synchronize the times of tasks between programs and processes and collects all debug logs of other programs that are related to each of the tasks. The execution sequences of all of the programs are identified by the logs. In the first scenario 602, execution flows 604 and 608 are processed by the parallel program analysis module 208. Here, the parallel program analysis module 208 can determine that the flow with the RCV function 606 is executed based on the logs, as discussed above. For example, as discussed above with respect to FIG. 5, the existence of the debug message A1 indicates, based on the code fragment 502, that the send message associated with the queueing operation was executed.

In accordance with one exemplary aspect, parallel program analysis module 208 determines that a send task of one flow is taken if the debug log time of or corresponding to the send task is before the debug log time of a receive task of another flow. For example, if the flow 604 including the RCV function 606 exists in the log of the execution flow 604 and a message in the debug log for flow 608 that implies that the SND conditional branch 610, similar to the situation in FIG. 5, can be executed was generated before the execution of RCV function 606, then the parallel program analysis module 208 can determine that the conditional branch 610 was taken and that the conditional branch 611 was not taken. As such, the parallel program analysis module 208 can delete the conditional branch 611 from the flow 608.

Scenarios 620 and 640 illustrate cases in which a flow including a SND function is identified by the parallel program analysis module 208 as being executed based on the debug logs. For example, the parallel program analysis module 208 can identify that the SND function was executed in the same manner in which the parallel program analysis module 208 identified that the send message associated with the queuing operation was executed based on the code 502 and log 504 of FIG. 5. In the scenario 620, the SND function 626 of the flow 622 needs a response confirmation from the RCV branch 630 of the flow 624. For example, in response to sending a send message 628 to the task of flow 624, the task of flow 622 expects to receive an acknowledgement message 632. In this case, if the execution flow 622 including the SND Function repeatedly executes the SND function after the initial call of the SND function, as indicated by the debug log of the flow 622, the parallel program analysis module 208 identifies the conditional branch 630 of the flow 624 corresponding to the RCV function of the flow 624 as being taken. In addition, as a result, the parallel program analysis module 208 can deduce that the conditional branch 631 was not taken and can delete the branch 631.

In the scenario 640, it can be assumed that the SND function does not need an acknowledgment message and that the RCV function sleeps until receiving the message from the send function. Here, the SND function 646 of the execution flow 642 sends a send message 648 with a debug log time of 1:23:41 according to the debug log for the flow 642. In addition, the debug log for the flow 644 indicates that a task 649 was executed at 01:23:32 according to the debug log message 650 and that a task 651 was executed at 01:23:42 according to the debug log message 652. As indicated by the flow 644, one of the conditional branches 653 and 654 are executed between tasks 649 and 651 and within the execution time interval 655 defined by the times of the debug log messages 650 and 652. In this scenario, a user can specify an execution time interval threshold such that any execution time interval 655 that exceeds the threshold indicates that the receive function 654 was in a sleep mode. Thus, if the time difference of the execution timestamps of the log messages 652 and 650, i.e. the interval 655, is larger than the user-specified execution time interval threshold when the SND function 646 execution time falls within that interval 655, then the parallel program analysis module 208 determines that the RCV function 654 was in sleep mode and, in response thereto, determines that the conditional branch 654 was taken. In addition, as a result, the parallel program analysis module 208 can deduce that the conditional branch 653 was not taken and, in response thereto, can delete the branch 653.

As such, in these ways, for example, the portions of the execution flows which cannot be executed are identified and deleted from the flows by employing the debug logs generated by the programs executing in parallel. Here, the parallel program analysis module 208 can collect the debug log of a target program and other programs which affect the target program, and can then delete portions of the execution flows using these debug logs and the output point of the debug logs in the execution flows generated through the static analysis.

With continuing reference to FIGS. 3 and 4, the method 300 can proceed to step 310, at which the pruning module 214 can determine other unlikely branches based on the deductions of step 308 to prune the execution flows. For example, as illustrated in FIG. 4, the pruning module 214 can implement the pruning at block 430 by comparing one or more execution flows to pairs of send-receive application programming interfaces 403 deduced from the source code or obtained from an operating system or a user to determine any other conditional branches that were not taken. For example, if an API pair of sending-receiving messages (Snd1,Rcv1), . . . , (SndN,RcvN) exists and there is no corresponding pair in the execution flows, then any corresponding send or receive task in any of the execution flows is deleted. For example, assume that the pairs of send-receive application programming interfaces 403 includes a pair snd2 422, from flow 408, and rcv2, which was deleted from flow 410 by the parallel program analysis module 208. Here, the pruning module 214 compares the snd2-rcv2 API pair to the execution flows and determines that the pair does not exist due to the fact that the rcv2 branch is missing from the execution flows. As such, the pruning module 214 deletes the branch 422 from the flow 408 to generate flow 432 for output with flow 420 at step 312 as modified execution flows 218, output by the pruning module 214 of the system 200 of FIG. 2. It should be noted that the additional pruning, although preferred, is optional and that the execution flows 212 can alternatively be output by the system 200 as the flows 218.

Optionally, at step 314, a controller 222 of an operating system 220 can modify the operating system 220 based on the execution flows. For example, the controller 222 can remove pairs of send-receive application programming interfaces associated with any conditional branches removed from the flows by the system 200. For example, the controller 222 can remove the snd2-rcv2 API described above with respect to FIG. 4. The controller 222 can perform the same comparison between API pairs and the execution flows described above with respect to step 310 to determine the APIs to be removed. Indeed, the controller 222 can delete any modules or tasks deemed unnecessary based on the execution flows 218.

Thus, exemplary embodiments of the present invention can determine the most likely executed branches of a program based on static analysis of the code and on debug logs, as described above, without modifying the program or the monitoring software in any way. The determination of the most likely executed branches can improve the precision of operational verification processes by using the debug logs of a number of programs. Further, the efficiency of the execution environment can be improved by identifying the most likely execution flow of the operating system and by removing any unnecessary modules and/or tasks.

Figure 7:
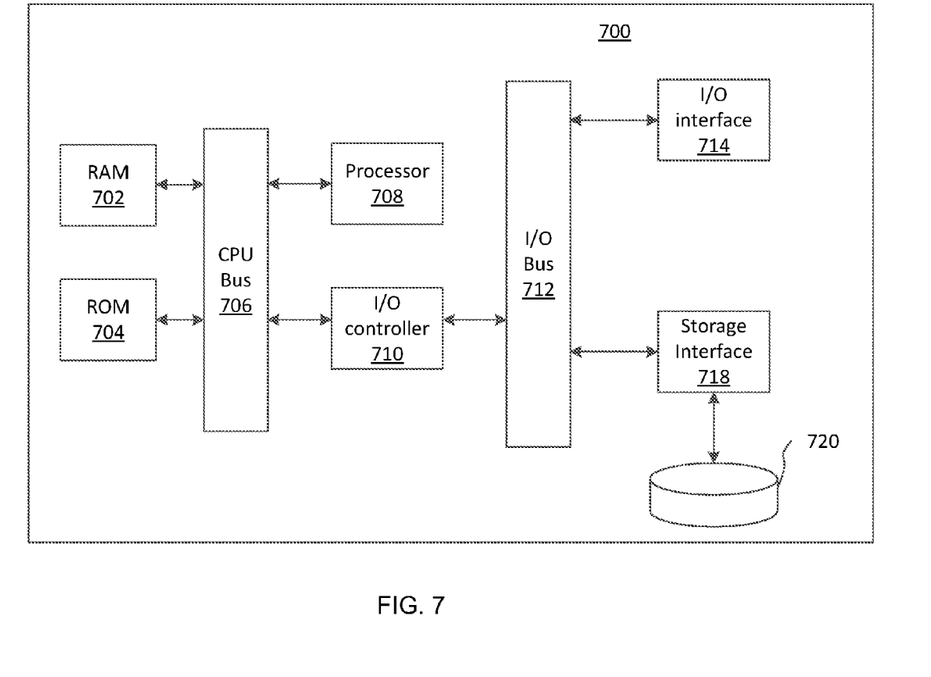
FIG. 7 is a high-level block diagram of a computing system by which exemplary method and system embodiments of the present invention can be implemented.

Referring now to FIG. 7, an exemplary computing system 700 in which system embodiments of the present invention described above can be implemented, and by which method embodiments of the present invention described above can be implemented, is illustrated. The computing system 700 includes a hardware processor 708 that can access random access memory 702 and read only memory 704 through a central processing unit bus 706. In addition, the processor 708 can also access a storage medium 720 through an input/output controller 710, an input/output bus 712 and a storage interface 718, as illustrated in FIG. 7. The system 700 can also include an input/output interface 714, which can be coupled to a display device, keyboard, mouse, touch screen, external drives or storage mediums, one or more external networks, etc., for the input and output of data to and from the system 700. In accordance with one exemplary embodiment, the processor 708 can access software instructions stored in the storage medium 720 and can access memories 702 and 704 to run the software and thereby implement the method 300 described above. In addition, the hardware processor 708 can, for example by executing software instructions stored on the storage medium 720, implement system elements described above, such as the static analysis module 204, the parallel program analysis module 208, the pruning module 214 and the controller 222. Alternatively, each of these system elements can be implemented via a plurality of respective processors 708 in one computer system or in a plurality of different computer systems on a network. Further, the source code of the programs 202, the debug logs 210, the execution flows 206, the execution flows 212, the APIs 216 and the modified execution flows 218 can be stored in the storage medium 720. Additionally, the input/output interface 714 can be employed to output the modified execution flows 218. Alternatively or additionally, the modified execution flows 218 can be stored in the storage medium 720 for subsequent retrieval by the operating system 220 and/or by a user.

Having described preferred embodiments of systems and methods for parallel program analysis and branch prediction (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for predicting execution paths of at least one target program of a plurality of programs that are run in parallel comprising:
generating first execution flows of the plurality of programs by conducting a static analysis of the plurality of programs;
executing the plurality of programs to obtain debug logs from the plurality of programs;
identifying communication messages transmitted between the execution flows from the debug logs;
deducing, by at least one hardware processor, that at least one conditional branch was taken in at least one given execution flow of the first execution flows by the target program based on the communication messages that are identified in the debug logs and removing, based on said deducing, at least one conditional branch that was not taken from the given execution flow; and
outputting modified execution flows that were modified in accordance with said removing to indicate predicted execution paths of the at least one target program.

2. The method of claim 1, further comprising:
modifying an operating system based on the modified execution flows by removing from the operating system at least one of a module or a task associated with the removed conditional branch.

3. The method of claim 1, wherein the method further comprises:
determining at least one conditional branch that was taken in at least one other execution flow, of the first execution flows based on said removing and removing at least one conditional branch that was not taken from the other execution flow to generate the modified execution flows.

4. The method of claim 3, wherein said determining further comprises comparing the given execution flow from which the respective conditional branch was removed to pairs of send-receive application programming interfaces to determine the conditional branch of the other execution flow that was not taken.

5. The method of claim 4, wherein the method further comprises:
modifying an operating system by removing at least one of the pairs of send-receive application programming interfaces associated with the conditional branch removed from at least one of the given execution flow or the other execution flow.

6. The method of claim 1, wherein the deducing further comprises comparing a debug log time of a send or a receive task of at least one other execution flow of the first execution flows to a debug log time of a task, of the given execution flow, that includes given conditional branches to determine which of the given conditional branches was taken and to remove any of the given conditional branches that was not taken.

7. The method of claim 6, wherein the send or the receive task of the at least one other execution flow is a receive task, wherein the given conditional branches include a send task, and wherein the send task of the given conditional branches is determined to be taken if the debug log time of the task of the given execution flow is before the debug log time of the receive task.

8. A non-transitory computer readable medium comprising a computer readable program for predicting execution paths of at least one target program of a plurality of programs that are run in parallel, wherein the computer readable program when executed on a computer causes the computer to perform the steps of:
generating first execution flows of the plurality of programs by conducting a static analysis of the plurality of programs;
executing the plurality of programs to obtain debug logs from the plurality of programs;
identifying communication messages transmitted between the execution flows from the debug logs;
deducing that at least one conditional branch was taken in at least one given execution flow of the first execution flows by the target program based on the communication messages that are identified in the debug logs and removing, based on said deducing, at least one conditional branch that was not taken from the given execution flow; and
outputting modified execution flows that were modified in accordance with said removing to indicate predicted execution paths of the at least one target program.

9. The non-transitory computer readable medium of claim 8, wherein the method further comprises:
determining that at least one conditional branch was taken in at least one other execution flow of the first execution flows based on said removing and removing at least one conditional branch that was not taken from the other execution flow to generate the modified execution flows.

10. The non-transitory computer readable medium of claim 9, wherein said determining further comprises comparing the given execution flow from which the respective conditional branch was removed to pairs of send-receive application programming interfaces to determine the conditional branch of the other execution flow that was not taken.

11. The non-transitory computer readable medium of claim 10, wherein the method further comprises:
modifying an operating system by removing at least one of the pairs of send-receive application programming interfaces associated with the conditional branch removed from at least one of the given execution flow or the other execution flow.

12. The non-transitory computer readable medium of claim 8, wherein the deducing further comprises comparing a debug log time of a send or a receive task of at least one other execution flow of the first execution flows to a debug log time of a task, of the given execution flow, that includes given conditional branches to determine which of the given conditional branches was taken and to remove any of the given conditional branches that was not taken.

13. The non-transitory computer readable medium of claim 12, wherein the send or the receive task of the at least one other execution flow is a receive task, wherein the given conditional branches of the given conditional branches include a send task, and wherein the send task is determined to be taken if the debug log time of the task of the given execution flow is before the debug log time of the receive task.

14. A system for predicting execution paths of at least one target program of a plurality of programs that are run in parallel comprising:
a static analysis module configured to generate first execution flows of the plurality of programs by conducting a static analysis of the plurality of programs;
a parallel program analysis module, implemented by at least one hardware processor, configured to execute the plurality of programs to obtain debug logs from the plurality of programs, identify communication messages transmitted between the execution flows from the debug logs, deduce that at least one conditional branch was taken in at least one given execution flow of the first execution flows by the target program based on the communication messages that are identified in the debug logs, and remove at least one conditional branch that was not taken from the given execution flow; and
a third module configured to output modified execution flows that were modified in accordance with the removal of the conditional branch that was not taken to indicate predicted execution paths of the at least one target program.

15. The system of claim 14, further comprising:
an operating system controller configured to modify an operating system based on the modified execution flows by removing from the operating system at least one of a module or a task associated with the removed conditional branch.

16. The system of claim 14, wherein the third module is a pruning module that is configured to determine that at least one conditional branch was taken in at least one other execution flow of the first execution flows based on the removal and to remove at least one conditional branch that was not taken in the other execution flow from the other execution flow to generate the modified execution flows.

17. The system of claim 16, wherein the pruning module is further configured to compare the given execution flow from which the respective conditional branch was removed to pairs of send-receive application programming interfaces to determine the conditional branch of the other execution flow that was not taken.

18. The system of claim 17, wherein the system further comprises:
an operating system controller configured to modify an operating system by removing at least one of the pairs of send-receive application programming interfaces associated with the conditional branch removed from at least one of the given execution flow or the other execution flow.

19. The system of claim 14, wherein the parallel program analysis module is further configured to compare a debug log time of a send or a receive task of at least one other execution flow of the first execution flows to a debug log time of a task, of the given execution flow, that includes given conditional branches to determine which of the given conditional branches was taken and to remove any of the given conditional branches that was not taken.

20. The system of claim 19, wherein the send or the receive task of the at least one other execution flow is a receive task, wherein the given conditional branches of the given conditional branches include a send task, and wherein the send task is determined to be taken if the debug log time of the task of the given execution flow is before the debug log time of the receive task.

* * * * *